United States Patent [19]
Carter et al.

[11] 3,859,370
[45] Jan. 7, 1975

[54] MASSIVE NICKEL CATALYSTS AND USE IN HYDROGENATION PROCESSES

[75] Inventors: James L. Carter, Chatham; Wayne G. Custead, Elnora, both of N.Y.

[73] Assignee: Exxon Research & Engineering Company, Linden, N.J.

[22] Filed: June 26, 1972

[21] Appl. No.: 266,321

Related U.S. Application Data

[63] Continuation-in-part of Ser. No. 84,163, Oct. 26, 1970, abandoned, which is a continuation-in-part of Ser. No. 877,001, Nov. 14, 1969, abandoned.

[52] U.S. Cl.............. 260/638 B, 208/143, 252/459, 260/667, 260/683.9, 260/690
[51] Int. Cl............................ C07c 5/04, C07c 5/10
[58] Field of Search............ 260/667, 683.9, 638 B; 252/452

[56] References Cited
UNITED STATES PATENTS

| | | | |
|---|---|---|---|
| 3,351,566 | 11/1967 | Taylor et al. | 252/452 |
| 3,440,272 | 4/1969 | Frainnet et al. | 260/667 |
| 3,509,226 | 4/1970 | Eng | 260/683.9 |
| 3,547,830 | 12/1970 | Shropshire | 252/452 |
| 3,586,728 | 6/1971 | Otani et al. | 260/667 |
| 3,697,445 | 10/1972 | Carter | 252/452 |

*Primary Examiner*—Paul M. Coughlan, Jr.
*Attorney, Agent, or Firm*—Joseph J. Dvorak

[57] ABSTRACT

An improved process for hydrogenating organic compounds is provided in which a catalyst is employed that has a nickel surface area greater than about 70 $m^2/g$ and a sodium content less than 0.2 wt. percent based on the total weight of catalyst. Significantly improved activity is obtained with the nickel-silica catalyst of this invention particularly in conversion of benzene to cyclohexane, in reducing oxo aldehydes to alcohols, and hydrogenating olefin compounds to paraffins. The catalyst is prepared by coprecipitating nickel and silicate ions in the presence of a porous silica support under conditions of dilution that favor high surface areas and low inclusion of sodium in the catalyst.

7 Claims, No Drawings

MASSIVE NICKEL CATALYSTS AND USE IN HYDROGENATION PROCESSES

CROSS REFERENCES TO RELATED APPLICATIONS

This application is a Continuation-in-Part of U.S. Ser. No. 84,163 filed Oct. 26, 1970, now abandoned, which in turn is a Continuation-in-Part of U.S. Ser. No. 877,001, filed Nov. 14, 1969, now abandoned.

BACKGROUND OF THE INVENTION

This invention relates to highly active nickel-silica catalysts having stabilized high nickel surface areas and which contain very low quantities of alkali metals. More particularly, this invention is based on the discovery that such supported nickel-silica catalysts have improved activity in reactions involving hydrogenation of organic substrates when compared to catalysts which have low nickel-surface areas and relatively high concentrations of alkali metals in the active catalyst.

Nickel-silica catalysts supported on porous silica particles such as kieselguhr, infusorial, diatomaceous, or siliceous earth are known in the art and have been used widely for hydrogenation reactions. Typical hydrogenation reactions include the hydrogenation of olefins to saturated hydrocarbons, the hydrogenation of aromatics such as benzene and the conversion of oxo aldehydes and the like to the corresponding alcohols. No completely satisfactory process for such hydrogenation reactions has been developed, however, due to the limited activity level of prior art nickel catalysts and the fact that they deactivated quite rapidly.

Investigations have shown that the activity of the catalysts is directly related to the nickel surface area, and catalysts will deactivate more rapidly if the nickel surface area is lowered. Thus, catalysts with high nickel surface area will have more activity and have more acceptable catalyst life.

In a recent patent, U.S. Pat. No. 3,351,566, a nickel-silica catalyst was described which had a nickel surface area considerably higher than those known previously; areas disclosed in this patent range between 45 and 60 square meters per gram. Nickel surface area is expressed as area per unit weight of nickel or per unit weight of the total catalyst ($m^2/g$.). All references to nickel surface area are expressed on the basis of area per unit weight of total catalyst.

In copending application Ser. No. 78,601, filed Oct. 6, 1970, U.S. Pat. No. 3,697,445, a nickel-silica catalyst having nickel surface area greater than 70 $m^2/g$. is described. Although such high nickel surface area catalysts represent a substantial step forward in the catalyst art commercially viable hydrogenation processes nonetheless require catalysts with ever greater activity and prolonged catalyst life.

SUMMARY OF THE INVENTION

According to the instant invention, it has unexpectedly been found that when utilizing carefully controlled, critical conditions to form the catalyst, a nickel-catalyst supported on porous solid particles may be made which has a nickel surface area greater than about 70 $m^2/g$., and preferably 75 to 100 $m^2/g$. and catalytic activity for hydrogenation several times greater than the previously known nickel catalysts.

In general, in the present invention, the hydrogenation of organic cmpounds is vastly improved by carrying out the hydrogenation in the presence of a nickel-silica catalyst having a nickel surface area greater than 70 $m^2/g$. of active catalyst and an alkali metal content less than 0.2 wt. percent.

In a preferred embodiment of this invention a process for hydrogenating organic compounds having multiple chemical bonds is provided by effecting the hydrogenation of the substrate in the presence of a nickel silica-catalyst having a nickel surface area of about 75 to about 100 $m^2/g$., a total surface area of about 225 to about 300 $m^2/g$. and sodium content of about 0.1 wt. percent or lower, based on the total weight of active catalyst.

The production of the catalyst of the instant invention requires the use of separate solutions, which are preferably aqueous in nature. In a first solution, there is dissolved a source of silicate anion; in a second solution a source of nickel cation. Slurried within the solution containing the silicate anion is a porous support, preferably a porous silica support such as kieselguhr. The two solutions are commingled preferably by addition of the nickel-containing solution to the silicate solution over a period of approximately 5 to 40 minutes. By commingling the two previously prepared solutions the amount of dissolved nickel in the reaction mixture is kept exceedingly low and in general well below 0.60 moles/liter of aqueous mixture. This dilution of the dissolved nickel ions is essential in obtaining high nickel surface area catalysts. Also, the addition should be made at a substantially constant rate accompanied by vigorous mixing to increase uniformity in the catalyst formation. The mixture is then heated to its boiling point and a precipitating agent is added to precipitate dissolved silicate and nickel ions onto the porous support. A preferred precipitating agent is $NH_4HCO_3$. Alkali metal bicarbonate, hydroxides and oxides generally are not desirable precipitants for the process because of the likelihood that some of the alkali metal will ultimately be incorporated in the final catalyst.

During the preparation water is added to maintain a nearly constant volume so that water lost by evaporation is continually replaced. The aqueous mixture is kept at its boiling point for an extended period of 1 to 5 hours; it is then filtered and the resulting product is washed repeatedly with boiling water. Next the catalyst is dried, calcined in an oxygen source and activated. The activation procedure consists of contacting the catalyst with a gaseous reductant, usually flowing hydrogen.

As stated previously the nickel-containing solution and the silicate-containing solution are commingled under conditions of dilution such that the amount of dissolved nickel ions in the resultant aqueous mixture is maintained exceedingly low thereby providing for a high nickel surface area catalyst. Additionally, however, it is essential in preparing the catalyst of this invention, that the precipitation of the catalyst be made from dilute solutions, i.e. the nickel-containing solution must have a nickel concentration no greater than 1.0 moles/liter and an alkali metal silicate concentration no greater than 0.40 moles/liter. The most preferred solutions used in preparing the catalyst have no more than 0.75 moles/liter of nickel and 0.26 moles/liter of sodium metasilicate. This is contrasted with a more concentrated precipitation in which the solution contains up to twice as much solute.

About 30 to 90 wt. percent of the total silica content of the activated catalyst derives from precipitated silicate ions. Preferably, however, 50 to 70 wt. percent of the total silica content is derived from silicate ions.. Typically then the mole ratio of nickel to silicate employed ranges from about 0.75:1 to about 1.75:1.

The remaining steps in preparing and activating the catalyst are identical to those described above. The use of this dilute solution serves to produce a catalyst with substantially the same nickel surface area but considerably more catalytic activity. In fact, activity is increased by a factor of about two for the hydrogenation of benzene, for example.

Although not intending to be bound by any particular theory, it is hypothesized that the use of the additional solvent, i.e., water serves to reduce the alkali metal ion concentration in the solution, therefore less alkali metal, e.g., sodium, can be trapped inside the crystallites that are precipitated. In any event, experiments have demonstrated that repeated washings of nickel-silica catalysts will not reduce the alkali metal content of the catalyst and thereby increase catalyst activity. Only when dilute solutions are employed in the manner described herein, can highly active, low sodium containing catalysts be obtained.

In more detail, the instant invention pertains to the production of an improved catalyst for hydrogenation. The catalyst may be used to hydrogenate aromatics as typified by the hydrogenation of benzene to cyclohexane, the hydrogenation of aldehydes both saturated and unsaturated to the alcohols as in the well known oxo process, the hydrogenation of the double bonds in edible fats and oils as well as other olefin both straight and branched chain, and the hydrogenation of nitro compounds to amines. Indeed, olefins as used herein signify unsaturated compounds having at least one multiple bond and contemplate polyunsaturated compounds as well.

To form the catalyst, nickel and silicate ions must be coprecipitated onto a porous solid particulate support, preferably a porous silica particulate support. Initially, two distinct solutions are prepared; in one of these solutions is a silicate ion source such as alkali silicates, i.e., sodium and potassium silicates, sodium meta silicate, etc. salicic acid or hydrolyzed silicone hydride.

The amount of silicate anion within this solution will vary from about 1 to 30 grams per liter, preferably 10 to 20 grams per liter. The solution may be maintained at ambient pressure and temperature.

A second solution, containing a source of nickel cation is also prepared; the source of nickel cation may be any of the following: nickel nitrate, nickel chloride and nickel bromide. The concentration of the nickel containing solution will vary from 5 to 60 grams of nickel per liter, preferably 30 to 45 grams per liter.

Other sources of nickel cation and silicate anion may be utilized and will be obvious to one skilled in the art.

Porous solid particles, preferably silica particles, will be slurried in the silicate anion solution. In particular, kieselguhr, infusorial, diatomateous, siliceous earth, silica or alumina would be the source of the porous particles. The concentration of the porous solid particles can be expressed as percent of the total silica in the catalyst and should be from 10 to 70 percent, preferably from 30 to 50 percent by weight.

The two solutions are commingled at a slow rate to effect maximum mixing. Typically, the nickel nitrate solution would be added to a sodium meta silicate solution uniformly over approximately a 5 to 40 minute period, preferably 10 to 30 minute period. Following the commingling of the two solutions, coprecipitation of nickel and silicate ions must be completed. This may be effected by various methods known in the art, but it is most preferred that the coprecipitation of nickel and silicate ions in aqueous solution containing the solid carrier particles be completed by addition of a water soluble alkaline precipitating compound such as ammonium bicarbonate. The solution should then be heated to about its boiling point. The alkaline ammonium precipitants are most suitable for minimizing the amount of alkali metal residua which has to be removed by washing to avoid poisoning action on the finished catalyst. In some instances, the potassium precipitants may be used where the potassium acts as a promoter rather than as a poison.

The salts of the metal are preferably the water-soluble compounds, e.g., nitrates, formates or oxalates. The preferred catalytic metal is nickel but other catalytic metals may be used; these metals include cobalt and iron.

Following the precipitation, the mixture is maintained at the boiling point for above 1 to 5 hours; then it is filtered and washed 4 times with boiling water. Precipitated catalyst is then dried by heating for about 1 to 5 hours at a temperature of 200° to 400°F. It is then calcined by heating in the presence of an oxygen-containing gas or air to a temperature in the range of 600° to 900°F. for a period of 2 to 8 hours, preferably 3 to 5 hours.

After the calcining is completed, the catalyst must be reduced in order to activate it. Reduction is carried out in the presence of a reducing gas which is preferably hydrogen. Hydrogen is passed over the catalyst at ambient temperature at a rate of 5 l./Hr./gm. catalyst to 100 l./Hr./gm. catalyst, preferably 10 l./Hr./gm. to 30 l./Hr./gm and then the temperature is raised to 600° to 900°F. at approximately 10°F. per minute and maintained at this temperature with the hydrogen flowing for approximately 1–4 hours and preferably above 2 hours. The reduction is preferably carried out after the catalyst has been loaded into a suitable reactor either batch or continuous flow, the nature of the reactor will be obvious to one skilled in the art.

At this point, the catalyst is sensitive to deactivation and may not be stored in the presence of oxygen at ordinary temperatures without being passivated first. The passivation step may consist of purging the reactor at a temperature greater than 300°F. with an inert gas, preferably nitrogen, cooling to ambient temperature and then passing tne inert gas over the catalyst while an air bleed is introduced into the inert gas so as to hve approximately 1–2 mol percent of oxygen present. This procedure will passivate the catalyst by putting a surface oxide coating on it.

The resulting catalyst, in the reduced state, has a nickel surface area of 70 to 100 m²/g. and a total surface area of 150 to 300 m²/g. Also, the catalyst contains about 0.1 wt. percent or less of sodium and from 25 wt. percent to about 50 wt. percent of nickel. The catalyst is extremely active for the hydrogenation of olefins (which term includes diolefins and the like), aromatics, aldehydes both saturated and unsaturated in the oxo process, edible fats and oils, and nitro compound to amines, preferably $C_2$ to $C_{20}$ olefin straight and branched chain, $C_6$ to $C_{20}$ aromatics including condensed on-aromatics and $C_1$ to $C_{20}$ aldehydes.

One particularly useful hydrogenation is the conversion of benzene to cyclohexane. This invention provides an improved process for reducing benzene to cyclohexane by hydrogenating benzene in the presence of a nickel-silica catalyst having less than 0.2 wt. percent sodium and preferably 0.1 wt. percent or less sodium in the active catalyst.

Another useful hydrogenation is the conversion of aromatics in white spirits to yield high quality solvents. The upgrading of white spirits by the process of this invention is an improvement in the treatment of such materials.

Another useful improved hydrogenation is the conversion of olefins in paraffin solvents such as denoneinizer bottoms and deoctenizer overheads.

The conditions for the hydrogenation reactions which have been discussed vary widely and are well known to those skilled in the art; broadly the following conditions may be utilized: temperatures 150°–1000°F.; pressure 1 atm.–12,000 psig; feed rate 0.2–100 V/Hr./V; $H_2$ treat 2,000–10,000 SCF/B.

The oxo process is the addition of carbon monoxide and hydrogen to alkenes in order to produce alcohols, aldehydes and other oxygenated organic compounds. Typical alkenes which may be utilized in the process are those having 2 to 20 carbon atoms; conditions for oxo would be temperatures of 150° to 350°F.; hydrogen to hydrocarbon mol ratio of 0.5 to 10.0 pressure of 100 to 1000 psig.

The produce of such a carbonylation process generally consists of aldehydes, acetals, unsaturated oxygenated materials and the like which require hydrofinishing in a second or further hydrogenation stage. It is to the treatment of the aldehyde product, in particular, that the present invention applies.

Hydrogenation conditions in this further reaction stage follow those generally employed in the first stage.

SPECIFIC EMBODIMENTS

Example 1

In all examples the nickel surface area of the catalyst is measured as follows: the chemisorption of hydrogen on the reduced catalyst surface, at room temperature, in a conventional gas adsorption vacuum system as described in detail in J. Am. Chem. Soc. 86,2996 (1964) Yates, Taylor and Sinfelt which is herein incorporated by reference.

In this Example a catalyst having a 90 $m^2/g$. nickel surface area and 0.2 wt. percent Na was prepared.

The catalyst was prepared as follows: 1125 grams of $Ni(NO_3)_2 \cdot 6H_2O$ was added to 2.25 liters of water. 380 grams of $Na_2SiO_3 \cdot 9H_2O$ was added to 2.25 liters of water. To the second solution was added 50 grams of kieselguhr which was stirred well to maintain it in suspension. The salts were added to the water at ambient temperature and stirred until dissolved. All stirring was done with an electric stirrer at 600 RPM; the addition took place in standard laboratory equipment. The nickel solution was then added to the sodium silicate solution uniformly over a period of approximately 15 minutes. During this time the sodium silicate solution was stirred vigorously; the mixture was then heated to its boiling point. With the mixture at its boiling point, 800 grams of $NH_4HCO_3$ was added uniformly over approximately 15 minutes. During this operation water was lost by evaporation; water was added to replace that which was lost. After all of the $NH_4HCO_3$ was added the mixture was stirred at its boiling point for 3 hours. Water was again replaced as it was lost by evaporation. The mixture was filtered and the solid portion was washed 5 times with boiling water. Each wash consisted of 2 liters of water. Finally, the solid catalyst was dried at 200°F., calcined in air for 4 hours at 750°F., and activated by treatment with flowing hydrogen for several hours at about 670°F. About 395 grams of catalyst were recovered.

The catalyst which was prepared was found to have 90 $m^2/g$. of nickel surface area and contained 0.2 wt. percent sodium.

Example 2

A sample of the catalyst prepared in Example 1, was used to convert benzene into cyclohexane in a continuous hydrogenation reactor. The test conditions were: temperature of 100°C.; a space velosity of 25 W/H/W, a pressure of 1 atmosphere and a hydrogen-to-hydrocarbon mole ratio of 40. Under these conditions 36.6 percent of the benzene was converted to cyclohexane, this conversion was determined by the gas chromatography method.

Example 3

About 750 g. of $Ni(NO_3)_2 \cdot 6H_2O$ and 320 g. of $Na_2SiO_3 \cdot 9H_2O$ were added together to 50 g. of kieselguhr which has been slurried in 3.5 liter of water. The solution was mixed and then heated to its boiling point and 800 g. of ammonium carbonate were added. After the precipitation was completed, the slurry was boiled an additional 3 hours. The resulting slurried solid was then filtered, washed, dried and calcined as described in Example 1. About 270 grams of catalyst were recovered. The resulting catalyst had a nickel surface area of 47 $m^2/g$. The area was determined by the same technique as was utilized in Example 1.

This example indicates that the use of a single solution rather than the separate solutions of Example 1 produces a catalyst with a far lower surface area i.e., 90 vs. 47 $m^2/g$.

Example 4

In this Example the exact conditions of Example 2 are utilized except that the catalyst produced in Example 3 is used in place of the catalyst produced in Example 1. That is to say, the catalyst is prepared as in the technique of Example 1 where all elements were added directly to one solution rather than with the separate mixing technique of Example 1. The test conditions for benzene hydrogenation are the same as described in Example 2 and the conversion to cyclohexane is only 18 percent as determined by the gas chromatography method.

This example demonstrates that the catalyst of Example 2 which has a lower surface area is correspondingly less active as a hydrogenation catalyst when compared to the catalyst of Example 1.

Example 5

In this Example the catalyst was prepared exactly as in Example 1 except for the following:

The total amount of water used in the two solutions was twice that which was used in Example 1. To be specific, the nickel nitrate was dissolved in 5 liters of water and the sodium metasilicate was dissolved in 5 liters of water. About 395 grams of catalyst were recovered.

The catalyst recovered had a nickel surface area of about 90 m²/g. and contained only about 0.1 wt. percent sodium. Thus, further, dilution did not have an effect on the surface area of the active catalyst but by increasing the solvent by a factor of two, the sodium content was reduced by a factor of one-half.

Example 6

In this Example the exact conditions of Example 2 are utilized except that the catalyst of Example 5 is utilized in place of the catalyst produced by the technique of Example 1. The conversion obtained is 62.8 percent; this demonstrates an improvement of a factor of 2 over the catalyst of Example 1 and a factor of 4 over the catalyst in Example 3. Thus, by diluting the solutions further one can obtain greater catalytic activity.

Example 7

A sample of the catalyst prepared in Example 5 was pelleted and used to convert 2-ethylhexanal to the corresponding alcohol. The test conditions were: temperature of 135°C.; a space velocity of 3.0 W/W/Hr., a pressure of 500 psig and a hydrogen-to-hydrocarbon mole ratio of 2.5. After 15 hours, 96.0 percent of the aldehyde was converted to the alcohol whereas in a test conducted under identical conditions but using a commercially available nickel catalyst only 70.1 percent of the aldehyde had been reduced.

This demonstrates a marked improvement in the conversion of oxo aldehydes to alcohols by virtue of the greater activity of the catalyst of this invention.

Example 8

As a further demonstration of the marked improvement in the conversion of aromatics to saturated compounds, such as the corresponding cycloparaffins, an aromatic containing white spirits feedstock having the properties set forth in Table I below was hydrogenated using the catalyst of this invention, designated as Catalyst A. In a separate test the feedstock was also hydrogenated using a commercially available nickel catalyst, designated as Catalyst B.

TABLE I

| Property | White Spirits Feed ASTM Test Method | Result |
| --- | --- | --- |
| Specific Gravity, 60/60°F. | D-287 | 0.7766 |
| ASTM Dist., °C. | D-86 | |
| IBP | | 153.5 |
| 50% | | 168.5 |
| FBP | | 195.5 |
| Aromatics, Wt.% | FIA | 15.6 |

Hydrogen feed rates in these tests were of the order of 500 liters of hydrogen per liter of feed. Other test conditions as well as the results of hydrogenations are given in Table II.

TABLE II

| Conditions | Catalyst A | Catalyst B |
| --- | --- | --- |
| Pressure, Kg/cm² | 15 | 25 |
| Reactor Temperature, °C. | | |
| Inlet | 141 | 251 |
| Maximum | 225 | 265 |
| Space Velocity, VVH | 0.79 | 0.75 |

TABLE II-Continued

| Conditions | Catalyst A | Catalyst B |
| --- | --- | --- |
| Aromatic Content of Product, Wt. % | 0.09 | 0.5 |

As can be seen from the foregoing, in the hydrogenation of aromatic containing materials such as white spirits is vastly improved when conducted in the presence of the catalyst of this invention.

Example 9

Another illustration of the improved conversion of unsaturated hydrocarbons to paraffins is provided by the following comparative test in which an olefin containing paraffin feed was hydrogenated with the catalyst of this invention, Catalyst A, and in two other runs with different commercially available catalysts, Catalyst B and C. The properties of the feed as set forth in Table III below.

TABLE III

| Properties | Olefin Containing Feed ASTM Test Method | Results |
| --- | --- | --- |
| Specific Gravity, 60/60°F. | D-287 | 0.7559 |
| ASTM Distillation, °C. | D-87 | |
| IBP | | 147 |
| 50% | | 153.5 |
| FBP | | 175.5 |
| Bromine Number | D-2710 | 113 |

As with Example 8, hydrogen feed rates were of the order of 500 liters of hydrogen per liter of feed. Other test conditions and results are given in Table IV below.

TABLE IV

| Conditions | Catalyst A | Catalyst B | Catalyst C |
| --- | --- | --- | --- |
| Pressure, Kg/cm² | 25 | 25 | 25 |
| Reactor Temps., °C. | | | |
| Inlet | 142 | 210 | 210 |
| Maximum | 255 | 254 | 255 |
| Space Velocity, VVH | 0.61 | 0.45 | 0.5 |
| Recycle/Feed | 2 | 2 | 2 |
| Bromine Number of Prod. | 0.025 | 0.030 | 0.060 |

The tests clearly show the present invention is a substantial improvement and yields a better product at a lower temperature and at a higher space velocity than is possible with commercially available catalysts.

What is claimed is:

1. A process for hydrogenating organic compounds which comprises contacting the organic compound with hydrogen in the presence of a nickel-silica catalyst having a nickel surface area of about 70 m²/g to 100 m²/g and a sodium content of about 0.1 wt. percent based on the total weight of catalyst.

2. The process of claim 1 wherein said catalyst has a total surface area greater than 225 m²/g.

3. The process of claim 1 wherein the organic compound is selected from the group consisting of olefins having from 2 to 20 carbon atoms, aromatic hydrocarbons having 6 to 20 carbon atoms and aldehydes having 1 to 20 carbon atoms.

4. The process of claim 3 wherein the organic compound is benzene, the hydrogenated product is cyclohexane, the nickel-silica catalyst contains 0.1 wt. percent sodium and the hydrogenation is carried out at temperatures of about 150° to about 1,000°F. and at pressures of 1 atmosphere to 12,000 psig.

5. The process of claim 3, wherein the organic compound is a carbonylation aldehyde product, the hydrogenated product is an alcohol, the nickel-silica catalyst contains 0.1 wt. percent sodium, and the hydrogenation is carried out at temperatures ranging from about 150° to about 300°F. and at pressures of about 10 psig to about 1,000 psig.

6. The process of claim 1 wherein the organic compound is a paraffin solvent containing a mixture of olefins having from 2 to about 20 carbon atoms.

7. The process of claim 1 wherein the organic compound is a paraffin solvent containing aromatic hydrocarbons.

* * * * *